US008745663B2

(12) United States Patent
Kummer

(10) Patent No.: US 8,745,663 B2
(45) Date of Patent: Jun. 3, 2014

(54) SYSTEMS AND METHODS FOR PROVIDING INFORMATION IN RESPONSE TO ELECTRONIC PROGRAM GUIDE USAGE

(75) Inventor: David A. Kummer, Englewood, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 441 days.

(21) Appl. No.: 12/023,816

(22) Filed: Jan. 31, 2008

(65) Prior Publication Data

US 2009/0199238 A1    Aug. 6, 2009

(51) Int. Cl.
*H04N 5/44*    (2011.01)
*G06F 3/00*    (2006.01)
*G06F 13/00*    (2006.01)

(52) U.S. Cl.
USPC .................. 725/41; 725/37; 725/39; 725/40; 725/42; 725/43

(58) Field of Classification Search
USPC ......................................................... 725/43
See application file for complete search history.

(56) References Cited

U.S. PATENT DOCUMENTS

| 5,940,073 | A | 8/1999 | Klosterman et al. | |
| 6,687,906 | B1 | 2/2004 | Yuen et al. | |
| 6,721,953 | B1* | 4/2004 | Bates et al. | 725/39 |
| 7,028,327 | B1* | 4/2006 | Dougherty et al. | 725/93 |
| 7,051,354 | B2 | 5/2006 | Mears | |
| 7,584,491 | B2* | 9/2009 | Bruckner et al. | 725/36 |
| 2003/0088872 | A1* | 5/2003 | Maissel et al. | 725/46 |
| 2003/0106057 | A1* | 6/2003 | Perdon | 725/45 |
| 2003/0145331 | A1 | 7/2003 | Escobar et al. | |
| 2004/0221308 | A1* | 11/2004 | Cuttner et al. | 725/46 |
| 2004/0230992 | A1* | 11/2004 | Yuen et al. | 725/43 |
| 2005/0015803 | A1* | 1/2005 | Macrae et al. | 725/41 |
| 2005/0097607 | A1 | 5/2005 | Kummer et al. | |
| 2005/0157215 | A1 | 7/2005 | Minnick et al. | |
| 2005/0160456 | A1 | 7/2005 | Moskowitz | |
| 2006/0051058 | A1 | 3/2006 | Rudolph et al. | |
| 2006/0059532 | A1 | 3/2006 | Dugan et al. | |
| 2006/0248470 | A1 | 11/2006 | Lee et al. | |

(Continued)

FOREIGN PATENT DOCUMENTS

| EP | 1124372 A2 | 8/2001 |
| WO | 9945702 A1 | 9/1999 |
| WO | 0237297 A1 | 5/2002 |
| WO | 0245421 A1 | 6/2002 |

OTHER PUBLICATIONS

European Patent Office "International Search Report and Written Opinion of the International Searching Authority," for International Application No. PCT/US2009/031421, mailed Apr. 16, 2009.

*Primary Examiner* — Justin Shepard
(74) *Attorney, Agent, or Firm* — Ingrassia Fisher & Lorenz, P.C.

(57) ABSTRACT

Systems and methods provide information to a user in response to usage of an electronic program guide provided by an appliance coupled to a display. Usage of the electronic program guide is observed from within the appliance, and any triggering events in the usage of the electronic program guide are identified. An instruction is then executed in response to the triggering event to thereby provide the information on the display. Information provided may include a graphic display, a video clip, a highlight of any portion of the electronic program guide, or other information as appropriate.

23 Claims, 3 Drawing Sheets

(56) References Cited

U.S. PATENT DOCUMENTS

| | | | |
|---|---|---|---|
| 2007/0130602 A1* | 6/2007 | Gulli et al. | 725/113 |
| 2007/0300256 A1* | 12/2007 | Coomer et al. | 725/44 |
| 2008/0066091 A1* | 3/2008 | Stefanik et al. | 725/8 |
| 2009/0019488 A1* | 1/2009 | Ruiz-Velasco et al. | 725/43 |

* cited by examiner

SYSTEMS AND METHODS FOR PROVIDING INFORMATION IN RESPONSE TO ELECTRONIC PROGRAM GUIDE USAGE

TECHNICAL FIELD

The present invention generally relates to electronic program guides, and more particularly relates to systems and methods for providing information in response to usage of an electronic program guide.

BACKGROUND

Most television viewers now receive their television signals through a content aggregator such as a cable or satellite television provider. In the typical instance, encoded television signals are sent via a cable or wireless data link to the viewer's home, where the signals are ultimately decoded in a set-top box or other appliance. The decoded signals can then be viewed on a television or other appropriate display as desired by the viewer.

Many content aggregators currently provide electronic program guides (EPGs) to aid viewers in selecting content. Such guides are typically viewable on a particular channel provided by the content aggregator. When the viewer tunes to the EPG channel, lists of available channels and programs are generally provided so that the viewer can identify currently-showing or upcoming programs that are of interest. Many EPGs also include some functionality to assist viewers in filtering or otherwise selecting programs. While EPGs have been well-received by users and currently enjoy wide adoption and use, opportunity remains to provide additional information to the user via the electronic program guide.

It is therefore desirable to create systems and techniques for providing information to the user via the electronic program guide, and in particular to provide information to the user that is responsive to actual usage of the EPG. These and other desirable features and characteristics will become apparent from the subsequent detailed description and the appended claims, taken in conjunction with the accompanying drawings and this background section.

BRIEF SUMMARY

In various exemplary embodiments, systems and methods provide information to a user in response to usage of an electronic program guide provided by an appliance coupled to a display. Usage of the electronic program guide is observed from within the appliance, and any triggering events in the usage of the electronic program guide are identified. An instruction is then executed in response to the triggering event to thereby provide the information on the display. Information provided may include a graphic display, a video clip, a highlight of any portion of the electronic program guide, or other information as appropriate.

Other embodiments provide a method of providing an advertisement in response to usage of an electronic program guide provided by an appliance coupled to a display. Usage of the electronic program guide from within the appliance is observed, and it is identified when a predetermined portion of the electronic program guide is visible on the display. In response to the predetermined portion of the electronic program guide being visible on the display, an instruction is executed to thereby present the advertisement on the display in conjunction with the electronic program guide.

In still other embodiments, systems for displaying an electronic program guide on a display are provided. The system includes a receiving interface configured to receive an instruction from a remote source, a data storage device configured to store the instruction received at the receiving interface, and a user input interface configured to receive an indication of an input from a user. A controller is configured to direct the production of an image of the electronic program guide on the display, to observe the inputs from the user while the electronic program guide is active, and, in response to an occurrence of a triggering event, to execute the instruction to thereby provide information to the user on the display.

Various other embodiments, aspects and other features are described in more detail below.

BRIEF DESCRIPTION OF THE DRAWING FIGURES

Exemplary embodiments will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

According to various exemplary embodiments, systems and methods are provided that allow information to be provided in the electronic program guide (EPG) in response to user behavior within the guide. That is, as the user interacts with the guide, certain information of particular relevance or interest can be presented and/or highlighted to attract the user's attention. For example, as the user is browsing through a channel or program listing that incorporates a particular program of interest, that program can be highlighted in any manner, or an advertisement for that program can be shown while the program is viewable in the EPG. Numerous different events or activities can be used to trigger a highlight instruction, as described more fully below.

Figure 1:
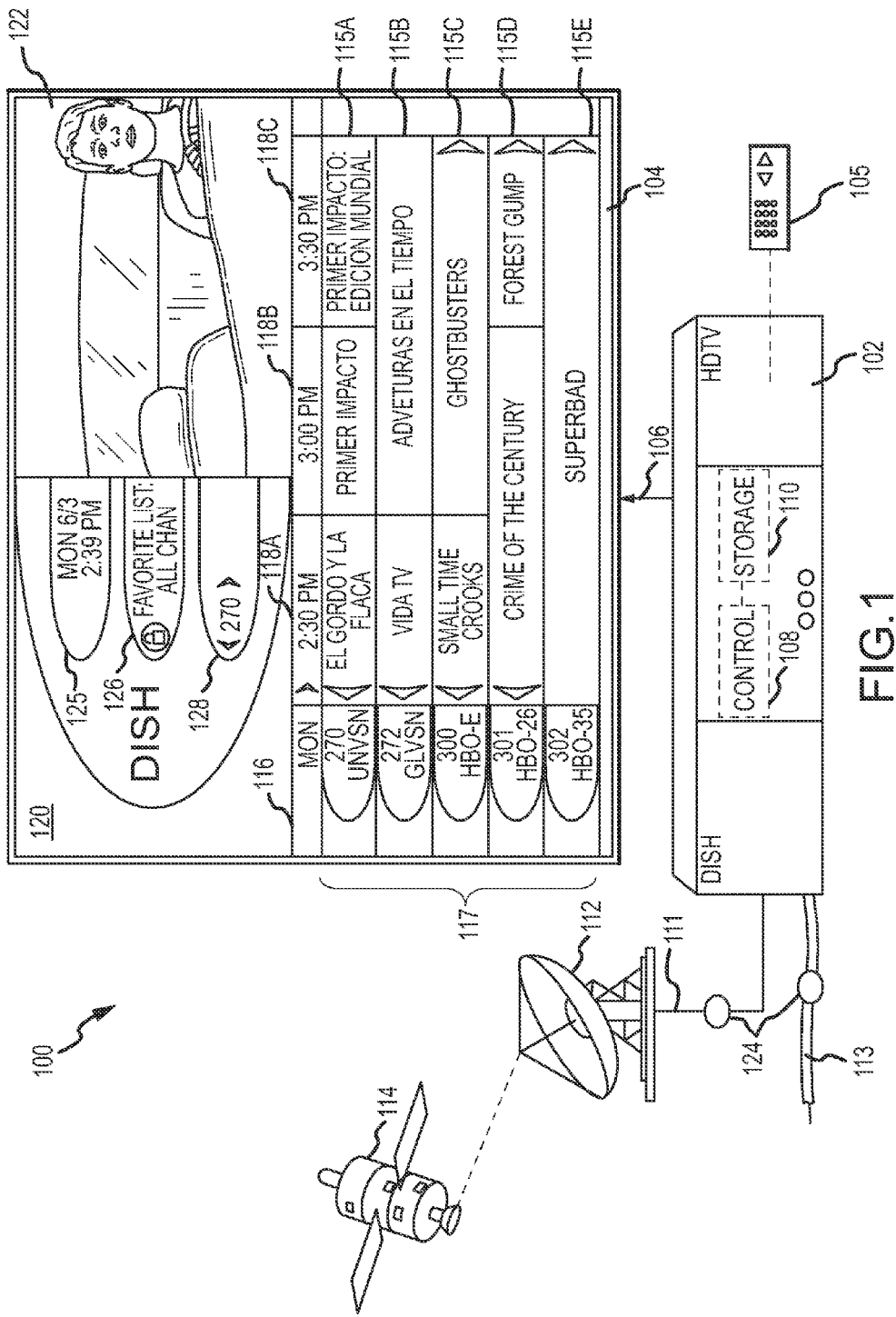
FIG. 1 is a diagram of an exemplary system for providing information to a user via an electronic program guide.

With reference now to the drawing figures and initial reference to FIG. 1, an exemplary system 100 for providing television content to a viewer suitably includes a set-top box or other appliance 102 that decodes signals 111/113 received via a wireless antenna 112, a cable connection and/or the like. In various embodiments, appliance 102 receives signals 111 from a satellite 114 via antenna 112, although other embodiments may receive signals from any other wired or wireless source, including cable connection 113. Appliance 102 also receives input instructions from a viewer or other user via a remote control 105 and/or via buttons or other inputs provided on the exterior of appliance 102. User inputs are received at any appropriate interface (e.g., an infrared or radio frequency (RF) interface) in appliance 102, and are used to extract desired content from signals 111 and/or 113 to create a suitable output signal 106 that is provided to a television or other display 104 for viewing by the user.

EPG features are typically controlled by the appliance 102 based upon information received from the content aggregator.

Typically, the content aggregator will provide the appliance with program listing information in any suitable digital format, and this information can be presented as appropriate on display 104 in response to inputs from the user. Appliance 102 typically includes a controller 108 such as any sort of microprocessor, microcontroller, digital signal processor and/or other circuitry that is capable of responding to user instructions to create output signal 106. Appliance 102 also typically includes any sort of memory, disk, optical and/or other storage 110 for storing data and instructions. In operation, then, appliance 102 receives video signals 111 or 113 from the content aggregator and demodulates the signals based upon user inputs to create the signal 106 used to drive display 104. When the user requests an EPG display, controller 108 further reacts to user inputs to create and adjust the display as desired by the user.

In the embodiment shown in FIG. 1, display 104 is shown presenting an exemplary EPG screen for the viewer. The EPG screen includes a program listing 117 that includes a number of channels 115A-E and programs presented in a grid arrangement. In addition to the program listing 117, the EPG screen shown in FIG. 1 contains other information of note. Window 120, for example, is a computer-generated graphical image that may contain advertising material (e.g. a logo of a content aggregator, television network, advertiser and/or other party), and/or may contain other information of use to the viewer. Further, in this embodiment a video window 122 is also provided for display of motion video. This video may be the current contents of any particular channel (e.g., the last channel viewed, a favorite channel or the like). In various embodiments, video window 122 is also able to present video advertisements (e.g. movie trailers or other commercials).

Program listing 117 may be formatted and presented in any manner. In the exemplary embodiment of FIG. 1, column 116 of program listing 117 generally contains a listing of channels that are available, with columns 118A-C representing time slots (e.g., half hour time slots in FIG. 1) and the corresponding row entries 115A-E providing programs showing on each channel during the relevant time slots. In the example shown in FIG. 1, for example, the movie "Ghostbusters" is shown playing on channel 300, beginning at 3 pm. EPG users who are interested in viewing this movie would therefore know that a showing was coming up in the near future. Depending upon the particular appliance 102, the user may want to set a reminder to tune to that channel at the appropriate time, to set a personal video recorder (PVR) or other device to record the showing, or to take any other action as appropriate. Alternately, the information may be simply used to notify the viewer that a show of interest is coming up soon so that the user can remember to tune to the channel of interest at the appropriate time.

Window 120 is similarly formatted and presented in any manner. The exemplary embodiment of FIG. 1, for example, includes a logo or other advertisement, and also includes a date and time display 125, an EPG mode indication 126, and a channel indicator 128 as appropriate. In this embodiment, mode indication 126 can be used to indicate an operating mode of the EPG. Examples of operating modes may include, without limitation, automatic or manual scrolling, displaying all channels, displaying all subscribed channels, displaying only favorite channels, displaying only programs of a particular criteria (e.g., high-definition, sports, news, movies, drama and comedy) or the like. Channel indicator 128 may indicate the last channel viewed, a favorite channel, a channel that is being displayed in window 122, or any other value as appropriate. Other embodiments may provide different information in window 120 from that described herein, or may omit the window 120 entirely.

In operation, program listing 117 typically scrolls in a vertical direction (either upwardly and/or downwardly) to allow additional channels 115 and programs to come into view on display 104. Scrolling may take place automatically, or in response to user inputs (e.g. inputs received from remote control 105). In addition to scrolling, users often have the capability to navigate within the program listing 117 to filter results by category (e.g., "news", "sports", "movies", and "hi-def"), by actor/actress name, and/or according to any other criteria. Additional information about one embodiment of an electronic program guide is presented in US Patent Publication 2005/0160456, although other embodiments may use alternate EPG techniques and systems in place of those described in this particular publication.

As the user interacts with the EPG, actions taken by the user can be observed to allow custom feedback to be provided to the user's EPG behavior. As a user scrolls to a particular portion of the program listing 117, for example, portions of the program guide can be enlarged, shaded, differently colored and/or otherwise highlighted to bring these portions to the user's attention. In other embodiments, the user's actions with respect to the EPG can be used to trigger information to be displayed in window 120 and/or video window 122 as desired. As the user scrolls near a listing for a movie, for example, a splash screen for the movie can be displayed in window 120, or a trailer for the movie can be shown in window 122. Trigger actions and/or responses made to trigger events may be received as a program or other instruction 124 that is receive via signals 111/113 from the content aggregator as appropriate. Numerous actions can be taken in various different embodiments, as described more fully below.

Figure 2:
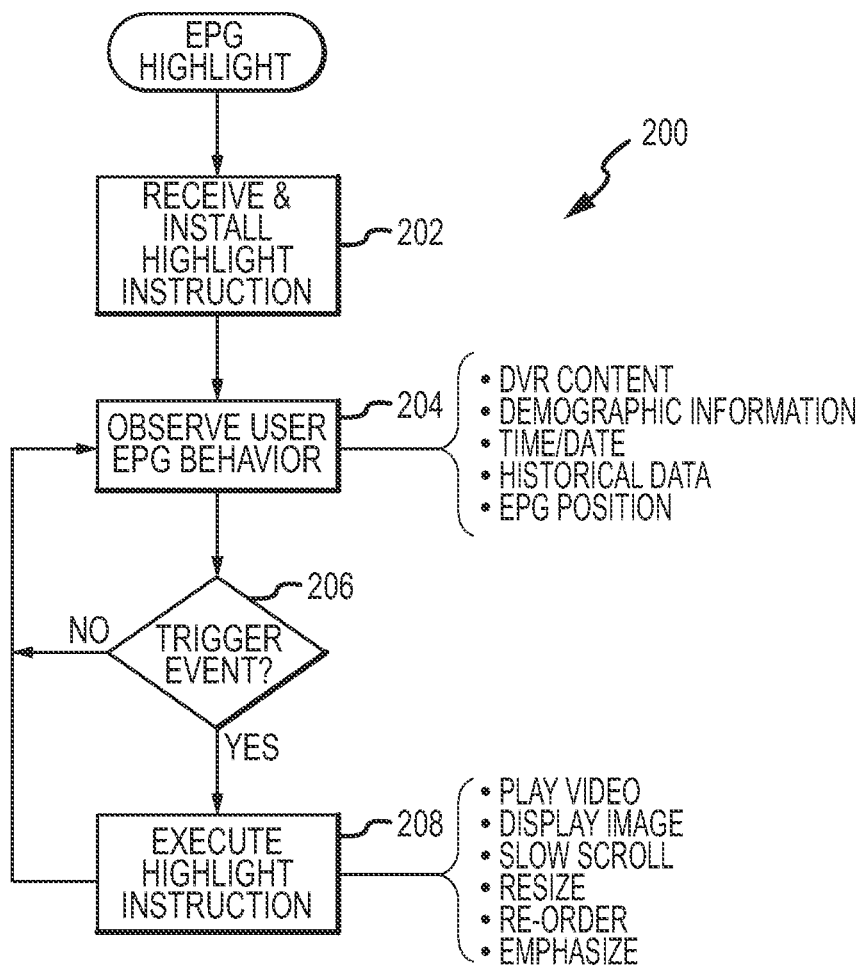
FIG. 2 is a flowchart of an exemplary technique for displaying information to a user using an electronic program guide.

Referring now to FIG. 2, an exemplary method 200 for presenting information in an EPG display suitably includes the broad steps of receiving an instruction to present information (step 202), observing user behavior with respect to the EPG (step 204), identifying any triggering events (step 206), and then executing the instructions to present or highlight information (step 208) in response to the triggering events. The logic used to control and execute the various steps may be implemented in any sort of hardware, software and/or firmware. For example, each of these steps may be computer-implemented by processing circuitry 108 residing within appliance 102. In such embodiments, controller 108 typically responds to software or firmware instructions that may be stored in any source or object code format in storage 110, and/or in any other location as appropriate.

Method 200 suitably begins by receiving and installing an instruction to highlight or otherwise provide information based upon EPG usage (step 202). In various embodiments, step 202 involves receiving an instruction 124 from a content aggregator (e.g., a cable, satellite or other wireless service provider via signals 111, 113 and/or the like). This instruction typically includes an identification of a triggering event, and a response to be made upon the occurrence of the triggering event. The response may include, for example, presenting a static image (e.g., in window 120), playing a video clip (e.g., in window 122), highlighting an entry in program guide 117, and/or any other action as appropriate. As such, the instruction 124 may include graphical and/or video content (e.g., a JPEG, TIFF, PNG or other static image, and/or an MPEG file) to be played in response to the triggering event. The instruction is received and processed in appliance 102 as appropriate to allow subsequent identification of a trigger event occurrence.

Instructions may be created and distributed based upon any criteria. In various embodiments, a content aggregator may sell advertising space based upon user interaction with the EPG, with such advertising implemented using the structures and techniques described herein. A party wishing to promote a television show or movie, for example, could purchase advertising instructions that would produce, advertise, or otherwise highlight the show to users viewing the show's entry in the EPG. Again, the particularly instructions, advertisements and highlights provided could be selected and implemented in any manner.

While the user is interacting with the EPG, appliance 102 suitably observes the user's behavior (step 204), and responds accordingly. "Observing" in this sense may simply refer to monitoring user behavior to identify if any trigger events occur (e.g. scrolling to a relevant portion of the program guide 117). "Observing" need not involve any sort of monitoring of behavior over time, although alternate embodiments may provide such functionality if desired. To that end, triggering events need not be based solely upon EPG usage, but may also consider such additional information as historical viewing or EPG browsing information, content stored in a PVR or other recording device implemented within appliance 102, demographic information about the user/viewer, time or date information, and/or the like. That is, advertisements or highlights implemented may be based upon viewer preferences or demographics in addition to EPG behaviors. To present just a few examples, a user who is known (from past viewing habits, PVR choices, or any other factors) to enjoy classic movies could have such films highlighted in the EPG as the user browses past those entries. Similarly, seasonal favorites (e.g., holiday specials) could be highlighted at certain times of the year, and/or particular programs could be emphasized at certain times of the day (e.g., news programs in the early evening).

Upon the occurrence of a triggering event (step 206), the highlight instruction is executed (step 208). Such instruction may provide or emphasize the relevant information to the viewer. As noted above, the triggering event may be any sort of event based upon user activity in the EPG that results in an advertisement or highlight. Such events may include, without limitation, the user scrolling to a particular channel or program; the user lingering in the vicinity of a particular channel or program; the user requesting additional information about any particular channel or program; and/or the like.

The instruction executed in step 208 can similarly vary from embodiment to embodiment. Examples of instructions executed may include, without limitation, playing a video clip (e.g., in window 122), displaying a static image (e.g., in window 120), adjusting the scrolling speed of the program listing 117 so that particular programs remain in view for shorter or longer periods of time, re-shading and/or resizing portions of the display (e.g., the portion of program guide 117 showing a particular program), re-ordering windows viewable on display 104 so that a particular window is brought to the front, or otherwise emphasizing portions of the program listing 117 or any other portion the EPG display presented to the viewer.

Figure 3:
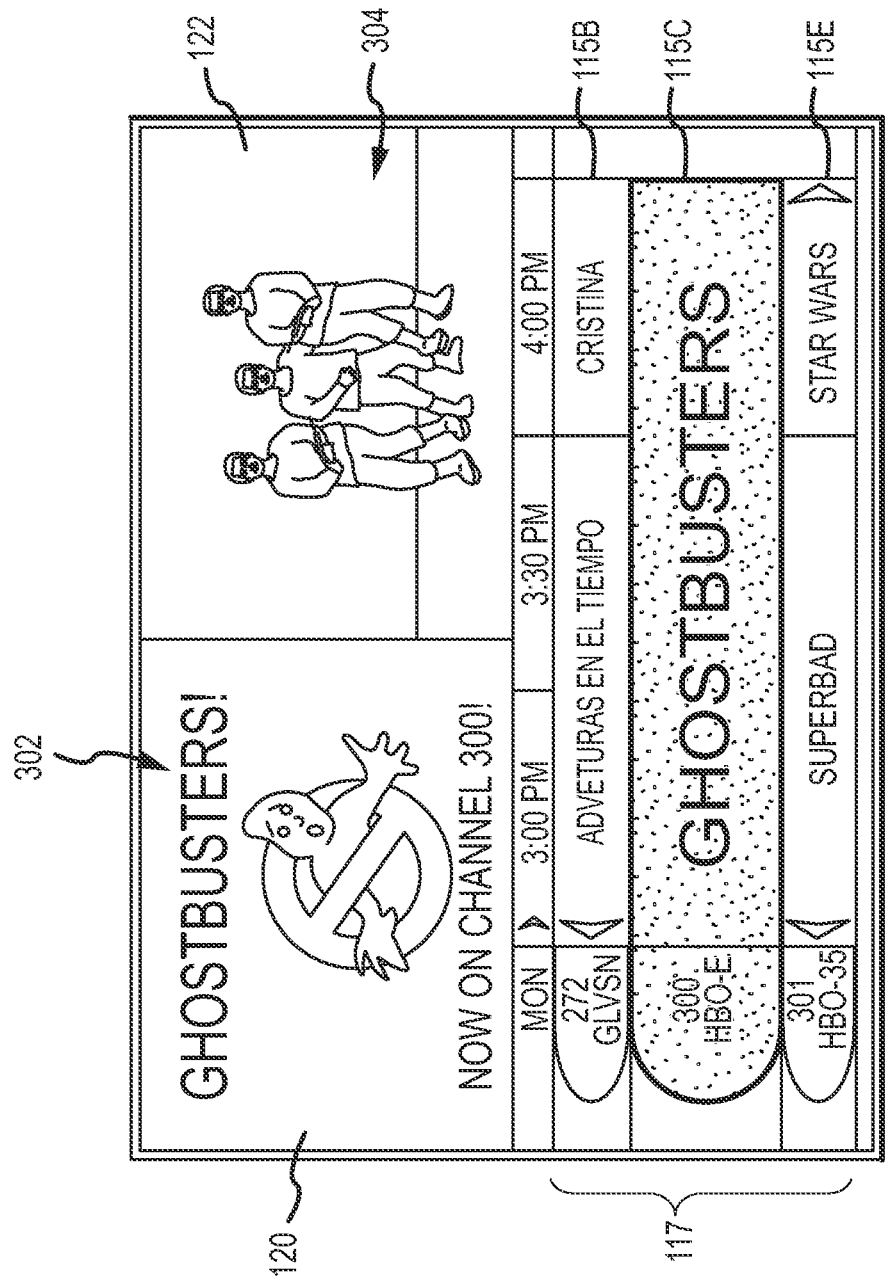
FIG. 3 is a diagram showing various types of information that can be displayed via an electronic program guide.

FIG. 3, for example, illustrates several different highlighting techniques that could be used in various embodiments. In the example shown in FIG. 3, the appliance 102 is programmed to identify the appearance of the "Ghostbusters" movie in the program listing 117 as a triggering event. When the movie does appear in the program listing 117 (e.g., on channel 300 beginning at 3 pm), this showing is advertised and/or otherwise highlighted in any of several different ways. A splash screen or other computer-generated image 302 may be presented in window 120, for example, to emphasize the showing of the movie. A promotional video clip 304 could be played in video window 122; this clip could be either a pre-formatted commercial sent as part of instruction 124, or could simply be the live feed from the channel (in this case channel 300) where the program is currently playing. In further embodiments, a user may be prompted to depress a certain key or take another simple action to immediately tune appliance 102 to present the advertised program on display 104.

FIG. 3 also shows simple highlighting of the "Ghostbusters" entry in which 115C has been enlarged with respect to the neighboring rows 115A-B and 115D-E to emphasize the current programming on channel 300. In the embodiment shown in FIG. 3, row 115C has been enlarged without adjusting the size of rows 115B and 115E; as a result, fewer rows 115 are simultaneously visible within listing 117 (e.g., rows 115A and 115D shown in FIG. 1 are no longer visible in the embodiment shown in FIG. 3). In another embodiment, the relative size of rows 115A-B and/or 115D-E could be adjusted such that each of these rows remain visible in the program listing 117, albeit at a smaller size. Other forms of emphasis may include shading some or all of row 115C with an attention-grabbing color scheme, changing a font size, color or style (e.g. bold face or italic) for certain program entries, adding or changing a border style for the program entries, and/or applying any other graphical effects within the program listing as desired. Again, information may be highlighted and/or otherwise presented to viewers in any manner, and according to any triggering criteria based upon the user's interaction with the EPG.

While at least one exemplary embodiment has been presented in the foregoing detailed description, it should be appreciated that a vast number of alternate but equivalent variations exist. Although the systems and techniques described herein are frequently described with respect to satellite-based implementations, for example, similar concepts could be readily applied with cable, telephone, wireless and/or any other methods of delivery. Similarly, although the particular advertising and highlighting referenced herein often relates to promotion of programs listed in the program listing 117, other types of advertisements or informational notices could also be provided based upon any factors. Users browsing through children's programming in the EPG, for example, could be provided with advertisements for children's products (e.g., toys, baby formula, etc.). Users browsing through sports programming could be provided with advertisements for food or beverages, for example, or other products with target demographics similar to those of the programs being browsed. Again, the concept of providing an advertisement or highlight based upon EPG behavior can be broadly applied across a wide range of equivalent embodiments.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

What is claimed is:

1. A method executable by a television receiver device that outputs television programming described by an electronic program guide to a display for viewing by a viewer, the method comprising:

receiving a broadcast television signal from a remote source at the television receiver device, wherein the broadcast television signal comprises the television programming, electronic program guide information about the television programming, and an identification of a particular program listing selected for promotion by the remote source that is to be emphasized by a change in the appearance of the electronic program guide presented on the display, and wherein the broadcast television signal comprising the identification of the particular program is simultaneously broadcast to multiple television receiver devices;

outputting the electronic guide information from the television receiver device to the display for presentation to a viewer;

observing usage of the electronic program guide by the viewer at the television receiver device;

detecting when the particular program listing is presented on the display during the usage of the electronic program guide by the viewer; and in response to the particular program listing being presented on the display during usage of the electronic program guide by the viewer, automatically executing an instruction by the television receiver device to thereby change the appearance of the electronic program guide output to the display and thereby attract the viewer's attention toward the particular program listing while the particular program listing is presented on the display.

2. The method of claim 1 wherein instruction is automatically executed without the viewer selecting the particular program listing in the electronic program guide.

3. The method of claim 2 wherein executing the instruction comprises changing the appearance of the electronic program guide on the display to emphasize the particular program listing.

4. The method of claim 1 wherein the instruction is automatically executed when the particular program listing is presented on the display to thereby attract the viewer's attention toward the particular program listing before the viewer selects the particular program listing.

5. The method of claim 4 wherein changing the appearance comprises highlighting the particular program listing in the electronic program guide.

6. The method of claim 4 wherein changing the appearance comprises enlarging the particular program listing in the electronic program guide.

7. The method of claim 4 wherein changing the appearance comprises adjusting a scrolling speed of the particular program listing in the electronic program guide.

8. The method of claim 2, wherein executing the instruction comprises providing an advertisement within the electronic program guide for the program described in the particular program listing.

9. The method of claim 1 comprising receiving the instruction from the remote source via a satellite link.

10. The method of claim 1 comprising receiving the instruction from the remote source via one of a cable link and a wireless link.

11. The method of claim 1 wherein the executing step further comprises determining information to be provided on the display in response to user preferences.

12. The method of claim 1 wherein the executing step comprises determining information to be provided on the display in response to additional information about the user, wherein the additional information is selected from a group consisting of: content stored on a digital video recorder, demographic information, a date, a time, and historical data about usage of the electronic program guide.

13. A method of providing an advertisement in response to usage of an electronic program guide provided to a display by a television receiver, the method comprising:

receiving a broadcast television signal at the television receiver from a remote source, wherein the broadcast television signal comprises television programming, information for the electronic program guide, and an instruction to change the appearance of the electronic program guide to promote a listing of a particular program selected by the remote source when the listing is displayed in the electronic program guide, and wherein the broadcast television signal comprising the instruction is simultaneously broadcast from the remote source to multiple television receiver devices;

identifying when the listing of the particular program is presented on the display by the electronic program guide; and in response to the particular program coming into view on the display of the electronic program guide, automatically executing the instruction to change the appearance of the electronic program guide and thereby attract attention to the listing of the particular program while the listing is presented on the display.

14. The method of claim 13 wherein executing the instruction comprises presenting a static image.

15. The method of claim 13 wherein executing the instruction comprises presenting a video clip.

16. The method of claim 13 wherein executing the instruction comprises highlighting the portion of the electronic program guide listing the particular program.

17. A system for outputting television programming described by an electronic program guide to a display, the system comprising:

a receiving interface configured to receive a broadcast television signal from a remote source, wherein the broadcast television signal comprises the television programming, electronic program guide information about the television programming, and an identification of a particular program listing in the electronic program guide that is to be emphasized by the remote source through a change in the appearance of the electronic program guide presented to the user on the display, wherein the broadcast television signal comprising the identification of the particular program is simultaneously broadcast from the remote source to multiple television receiver devices;

a data storage device configured to store the electronic program guide information;

a user input interface configured to receive an indication of an input from the user; and a controller configured to direct the production of an image of the electronic program guide on the display, and, when the particular program listing in the electronic program guide is displayed, to automatically change the appearance of the electronic program guide while the electronic program guide is active and to thereby attract the user's attention to the particular program listing in the electronic program guide while the particular program listing is presented on the display.

18. The system of claim 17 wherein the controller is configured to attract the user's attention by providing information to the user, wherein the information is selected from a group consisting of a video clip and a static image.

19. The system of claim 17 wherein the controller is configured to attract the user's attention by highlighting a portion of the electronic program guide that contains the particular program listing.

20. The system of claim 17 wherein the controller is configured to change the appearance of the particular portion of the electronic program guide to thereby attract the viewer's attention to a particular program listing in the electronic program guide.

21. The method of claim 13 wherein the remote source provides the broadcast television signal via a satellite link.

22. The method of claim 13 wherein the remote source provides the broadcast television signal via a cable television link.

23. The system of claim 17 wherein the receiving interface is a direct broadcast satellite interface.

* * * * *